(12) United States Patent
Roggero et al.

(10) Patent No.: US 7,970,593 B2
(45) Date of Patent: Jun. 28, 2011

(54) METHOD FOR GRADUALLY MODIFYING LITHOLOGIC FACIES PROPORTIONS OF A GEOLOGICAL MODEL

(75) Inventors: Frédéric Roggero, Rueil-Malmaison (FR); Guillaume Enchery, Rueil-Malmaison (FR); Catherine Ponsot-Jacquin, Versailles (FR)

(73) Assignee: IFP, Cedex (FR)

( * ) Notice: Subject to any disclaimer, the term of this patent is extended or adjusted under 35 U.S.C. 154(b) by 578 days.

(21) Appl. No.: 12/056,314

(22) Filed: Mar. 27, 2008

(65) Prior Publication Data

US 2008/0243447 A1    Oct. 2, 2008

(30) Foreign Application Priority Data

Mar. 30, 2007    (FR) ...................... 07 02405

(51) Int. Cl.
  G06F 7/60    (2006.01)
  G06G 7/48    (2006.01)
  G01V 3/38    (2006.01)
  G01V 1/00    (2006.01)
  G01N 15/08   (2006.01)

(52) U.S. Cl. .................... 703/10; 703/2; 702/5; 702/13; 702/14

(58) Field of Classification Search .............. 703/2, 10; 702/5, 13, 14
See application file for complete search history.

(56) References Cited

U.S. PATENT DOCUMENTS

| | | | |
|---|---|---|---|
| 6,618,695 B1 * | 9/2003 | Hu et al. | 703/2 |
| 6,662,109 B2 * | 12/2003 | Roggero et al. | 702/6 |
| 6,813,565 B1 * | 11/2004 | Hu et al. | 702/14 |
| 7,151,845 B2 * | 12/2006 | Hu | 382/109 |
| 7,200,533 B2 * | 4/2007 | Hu et al. | 703/2 |
| 7,274,993 B2 * | 9/2007 | Hu et al. | 702/14 |
| 7,392,166 B2 * | 6/2008 | Le Ravalec-Dupin et al. | 703/10 |
| 7,558,708 B2 * | 7/2009 | Le Ravalec-Dupin et al. | 703/2 |
| 2004/0138862 A1 | 7/2004 | Hu et al. | |
| 2006/0052938 A1 | 3/2006 | Thorne et al. | |

(Continued)

FOREIGN PATENT DOCUMENTS

EP    1 760 492 A1    3/2007

(Continued)

OTHER PUBLICATIONS

Hu, L. Y., 2000, Gradual Deformation and Interative Calibration of Gaussian-Related Stochastic Models: Math. Geology, vol. 32, No. 1.*

(Continued)

Primary Examiner — Jason Proctor
Assistant Examiner — Nithya Janakiraman
(74) Attorney, Agent, or Firm — Antonelli, Terry, Stout & Kraus, LLP.

(57) ABSTRACT

A method for gradually modifying a geological model representative of an underground reservoir to respect fixed average proportions of lithologic facies. A group of facies is selected and a subgroup of associated facies are selected. A transformation parameter is defined by the ratio between the average proportions of the facies of the association and the selection. Within the context of historical matching, a difference between measured dynamic data values and values calculated by a flow simulator from the geological model is measured. An optimization algorithm is used to obtain therefrom a new value for the transformation parameter that minimizes the difference and the transformation is applied to the lithologic facies of the selection. The modification can be applied to the entire model or to a given zone.

25 Claims, 4 Drawing Sheets

U.S. PATENT DOCUMENTS

2006/0149520 A1  7/2006  Le Ravalec-Dupin et al.
2007/0055447 A1  3/2007  Mickaele et al.

FOREIGN PATENT DOCUMENTS

| | | |
|---|---|---|
| FR | 2 780 798 | 1/2000 |
| FR | 2 795 841 | 5/2001 |
| FR | 2 821 946 | 9/2002 |
| FR | 2 846 767 | 5/2004 |
| FR | 2 851 670 | 8/2004 |

OTHER PUBLICATIONS

Hu, L. Y., Blanc, G. and Noetinger, B. (2001): Gradual Deformation and Interative Calibration of Sequential Stochastic Simulations. Math. Geology, vol. 33, No. 4.*

Hu, L.Y. et al, 1998, "Constraining a Reservoir Facies Model to Dynamic Data Using a Gradual Deformation Method", Paper B-01: Proc. 6th European Conference on Mathematics of Oil Recovery (ECMOR VI), Sep. 9-11, 1998, Peebles, Scotland, 7 pgs.*

Hu, L.Y., M. Le Ravalec, G. Blanc, F. Roggero, B. Noetinger, Institut Francais du Petrole; A. Haas, B. Corre, Elf Exploration & Production, "Reducing Uncertainties in Production Forecasts by Constraining Geological Modeling to Dynamic Data"; Copyright 1999.*

Le Ravalec, M. et al., 2000, The FFT Moving Average (FFT-MA) Generator: An Efficient Numercial Method for Generating and Conditioning Gaussian Simulations: Math. Geology, vol. 32, No. 6.*

Le Ravalec-Dupin, M., "Conditioning truncated Gaussian realizations to static data", Berlin, Germany, Sep. 15-20, 2002.*

Roggero, F. et al., 1998, Gradual Deformation of Continuous Geostatistical Models for History Matching, paper SPE 49004: Proc. SPE Annual Technical Conference and Exhibition, New Orleans.*

E. Manceau, M. Mezghani, I. Zabalza-Mezghani, F. Roggero, IFP, "Combination of Experimental Design and Joint Modeling Method for Quantifying the Risk Associated With Deterministic and Stochastic Uncertainties—An Integrated Test Study", 2001,. Society of Petroleum Engineers Inc.*

Hu, L.Y. 2000, "Gradual Deformation of Non-Gaussian Stochastic Simulations": vol. 1, 94-103.*

Hu, L.Y. 2003 "History matching of Object-Based Stochastic Reservoir Models". Society of Petroleum Engineers.*

Pierre Goovaerts, "Geostatistics for Natural Resources Evaluation", 1997, Oxford University Press, cover and copyright page.*

Ortiz, Julian M. et al: Scaling Multiple-Point Statistics to Different Univariate Proportions, Computers and Geosciences, Pergamon Press, Oxford, G.B., vol. 33, No. 2, Dec. 22, 2006, pp. 191-201, XP005812781.

Liu et al: "Using the *Snesim* Program for Multiple-Point Statistical Simulation", Computers and Geosciences, Pergamon Press, Oxford, G.B., vol. 32, No. 10, Dec. 2006, pp. 1544-1563, XP005625810.

Al-Khalifa, Mohammad A. et al: "Overcoming the Challenges of Building 3D Stochastic Reservoir Models using Conceptual Geological Models—A Case Study", SPE Middle East Oil Gas Show Conf.; SPE Middle East Oil and Gas Show and Conference, MEOS, Proceedigns; SPE $15^{TH}$ Middle East Oil and Gas Show and Conference, MEOS 2007, vol. 1, 2007, pp. 1-12, XP002465165.

Beucher, H., et al: "using 3D Seismic-Derived Information in Lithofacies Simulations, A Case Study", Proc. SPE Annu Tech Conf Exhib; Proceedings Exhibition—SPE Annual Technical Conference and Exhibition 1999 SOC PET ENG (SPE), Richardson, TX, USA, vol. Omega, 1999, pp. 581-592.

RamaRao, B.S., et al: "Pilot Point Methodology for Automated Calibration of an Ensemble of Conditionally Simulated Transmissivity Fields. 1. Theory and Computational Experiments", WATER RESOURCES RESEARCH, vol. 21, No. 3, pgs. 475-493, Mar. 1995.

Le Loch, G et al: 1997 "Truncated Plurigaussian Method : Theoretical and Practical Points of View". In: Geostatistics Wollongong '96, E.Y. Baafi and N. A. Schofield eds. Kluwer, pg. 211-222.

Doligez, B., et al: Seismic Fades Map Integration in Geostatistical Geological Model: a Field Case. Eage, Conference & Technical Exhibition of European Association of Geoscientists & Engineers, $64^{th}$, Florence, May 27-30, 2002, Extended abstracts, vol. 2, Pgs. 215-219.

Barens, L. et al: 2004: "Reservoir Facies Prediction from Geostatistical Inverted Seismic Data", Abu Dhabi International Conference and Exhibition, 10-13 Oct., SPE 88690-MS.

Goovaerts, P.: Geostatistics for Natural Resources Evaluation, Oxford University Press, 1997, pg. 125-184.

\* cited by examiner

METHOD FOR GRADUALLY MODIFYING LITHOLOGIC FACIES PROPORTIONS OF A GEOLOGICAL MODEL

BACKGROUND OF THE INVENTION

1. Field of the Invention

The present invention relates to the petroleum industry including geological modelling of oil reservoirs. More particularly, the invention relates to a method for gradually modifying a geological model representative of an underground reservoir to respect fixed average proportions of lithologic facies.

2. Description of the Prior Art

Optimization and development of petroleum reservoirs are based on the most accurate possible description of the structure and of the petrophysical properties of the reservoir. A tool is used by persons skilled in the art which allows accounting for the two aspects as an approximate way which is a geological model. The geological model best accounts for the structure and the petrophysical properties of a reservoir. The geological model includes a grid pattern forming the frame of the reservoir which is representative of the structure, and a 3 or 2 dimensional petrophysical property maps associated with this grid have to be representative of the static or dynamic behaviour of the reservoir.

Within the context of geological modelling of petroleum reservoirs, geostatistical modelling is increasingly used. In order to predict the dynamic behavior of a reservoir under production, numerical flow simulations are carried out from the geological model. In order to reduce uncertainties and to obtain a model representative of the real reservoir, the geological model must be conditioned by all of the data available. In order to apply this modelling type by integrating different data sources, the model is parameterized wherein parameters are defined which are referred to as "model matching parameters". By way of example, the matching parameters can be the average petrophysical properties of the facies (permeability, porosity, etc.), geostatistical properties such as parameters of a variogram (range, direction of anisotropy, etc.) or coefficients of the laws connecting certain properties (vertical anisotropy ratio, porosity/permeability law, etc.).

It is well known to take static data into account by means of this modelling type which allows construction of detailed geological models referred to as "geostatistical models" that best represent all of the available static data. By means of this technique, the well data, the seismic data and the geological observations (analogs, etc.) can be integrated into a coherent geological model by accounting for the uncertainties. The well data allow locally constrained geostatistical modellings by facies observations or measured petrophysical properties (porosity, permeability, etc.). The seismic data are used to describe the structure of the reservoir. In some cases, an analysis of the seismic attributes can be performed to define the spatial variations of the facies proportions, to introduce a non-stationary constraint in the geostatistical modelling process.

Taking account of dynamic data requires a suitable methodology for modifying models obtained from geostatistical modellings applied to static data. This adjusts an existing model to be coherent with dynamic data referred to as historical matching. The matching process must allow adjustment of some parameters of the geostatistical model while keeping the coherence with the static data and the geostatistical properties.

Many historical matching techniques have been developed for parameterizing and then adjusting geostatistical models to dynamic data. These techniques iteratively modify the initial geostatistical model until the simulated dynamic behavior reproduces the collected dynamic data. This problem is solved by minimizing an objective function that quantifies the difference between the dynamic data and the simulated corresponding responses.

There are known production data matching techniques for preserving the spatial structure of the geological model throughout the minimization process. In other words, it is possible to modify the petrophysical properties assigned to the grid cells of a model (a model is a set of grid cells each having well-defined spatial coordinates relative to the modelled reservoir) without perverting the global statistical properties of these properties. An example thereof is the pilot-point method that allows modifying the geological model locally around the pilot points:

RamaRao, B. S., LaVenue, A. M., Marsilly, G. de, et Marietta, M. G., 1995, "Pilot Point Methodology for Automated Calibration of an Ensemble of Conditionally Simulated Transmissivity Fields. 1. Theory and Computational Experiments", WRR, 31(3), 475-493.

Another known method is the gradual deformation method described in the following documents: French Patent 2,780,798 corresponding to U.S. Pat. No. 6,618,695, French Patent 2,795,841 corresponding to U.S. Pat. No. 6,813,565, French Patent 2,821,946 corresponding to U.S. Pat. No. 7,151,845, French Patent 2,846,767 corresponding to U.S. Published Application 2004/0138862 and French Patent 2,851,670 corresponding to U.S. Published Application U.S. 2006/0149520. This method allows perturbing a geostatistical realization of a random function (that is, a possible image of the reservoir model) from a reduced number of parameters while preserving the spatial structure of the realization. The advantage of this method is that it allows modification of the realization globally or locally. When the gradual deformation is global, a set of deformation coefficients that all apply similarly to all of the grid cells of the model is considered. When the gradual deformation is local, deformation coefficient sets are assigned to zones of the model and all the cells of a single zone are identically affected by the corresponding coefficient set. In case of a facies simulation, the gradual deformations modify the spatial distribution of the heterogeneities (described by the spatial position of the facies) while respecting the average geostatistical properties (variogram and facies proportion). The gradual deformations can be applied to the entire model or on a regional basis.

However, the change in geostatistical realization or in petrophysical properties is not always enough to explain the dynamic data. In particular, the average facies proportions can have a major impact on the dynamic behavior of the field. These proportion data can be global for the entire reservoir in the case of a stationary model (average proportion of sands for example) or they can determine the spatial trends or variations in the case of non-stationary models.

The initial proportions are generally determined from the well data and/or seismic data. They may contain uncertainties, regarding their global values as well as the spatial trends.

SUMMARY OF THE INVENTION

The invention relates to a method allowing gradual modification of a geological model by transforming locally or globally the lithologic facies proportions in order to constrain this geological model by dynamic data in a history matching process for example. The invention relates to a method for gradually deforming a geological model representative of an underground reservoir including a set of grid cells containing lithologic facies information which respects fixed average proportions of these lithologic facies. The average proportions are calculated by averaging facies proportions over at least one geographic zone of the reservoir. The method comprises:

defining the geographic zone of the reservoir by selecting a set of grid cells of the geological model;

grouping together p lithologic facies in a first group of facies;

within this first group, grouping together q lithologic facies in a second group of facies;

defining a transformation parameter by ratio $R_g$ of the average proportion $X_{a,g}$ of the facies of the second group to the average proportion $X_{s,g}$ of the facies of the first group;

transforming the proportions of lithologic facies of the second group and of its complement in the first group, at each cell of the geographic zone, so as to impose a fixed value for ratio $R_g$; and simulating a new geological model constrained by the modified lithologic facies proportions.

The lithologic facies proportions of the second group can be transformed by applying a transformation of the type as follows:

$$\forall k \in F_s, p^k \alpha(m,k) \cdot p^{k,0}(m)$$

with:

k facies belonging to the set of p lithologic facies of the first group of facies, $p^k$ (m) being the proportion of facies k in a cell m after transformation, $p^{k,0}(m)$ being the proportion of facies k in a cell m before transformation, and $\alpha(m,k)$ being a coefficient depending on transformation parameter $R_g$ and on the facies proportions before transformation.

For the simulation of the new geological model, a Gaussian simulation method with threshold can be advantageously used.

According to the invention, the average proportion values can be constrained by a kriging technique, which provides a continuity between the zone undergoing transformations and the outside of the zone where no transformation is applied.

The method allows successively applying several transformations. It is for example possible to modify the contrast between lithologic facies by applying to the geological model a power transformation defined as follows:

$$\forall\, m \in \text{Zone}, \forall\, k \in \text{Facies},\ p^{k,final}(m) = \frac{(p^k(m))^\beta}{\sum_{i \in Facies}(p^i(m))^\beta}$$

where:

Facies are all of the lithologic facies of the geological model

Zone is a zone of the domain defined by the user and corresponding to a set of grid cells $p^k(m)$ is a local proportion of facies k in cell m[.]

$p^{k,final}(m)$ is a proportion of facies k in cell m after application of said power transformation $\beta$ is a contrast parameter which is a real number ranging between 0 and 1.

According to the invention, the method can be applied to the historical matching of a geological model of an underground reservoir so as to reproduce measured dynamic data with the model including a set of grid cells provided with lithologic facies information. According to such an application, a difference between the measured dynamic data values and dynamic data values simulated by a flow simulator applied to the geological model is measured. The geological model is then gradually modified to minimize the error.

The invention can be directly applied to historical matching of a geological model. The goal of such a matching is to adjust some parameters of a geological reservoir model to reproduce dynamic data measured in the field. These data can be production data or data obtained from repeated seismic surveys (4D).

BRIEF DESCRIPTION OF THE DRAWINGS

Other features and advantages of the method according to the invention will be clear from reading the description hereafter of embodiments given by way of non limitative examples, with reference to the accompanying figures wherein.

DETAILED DESCRIPTION

Figure 1:
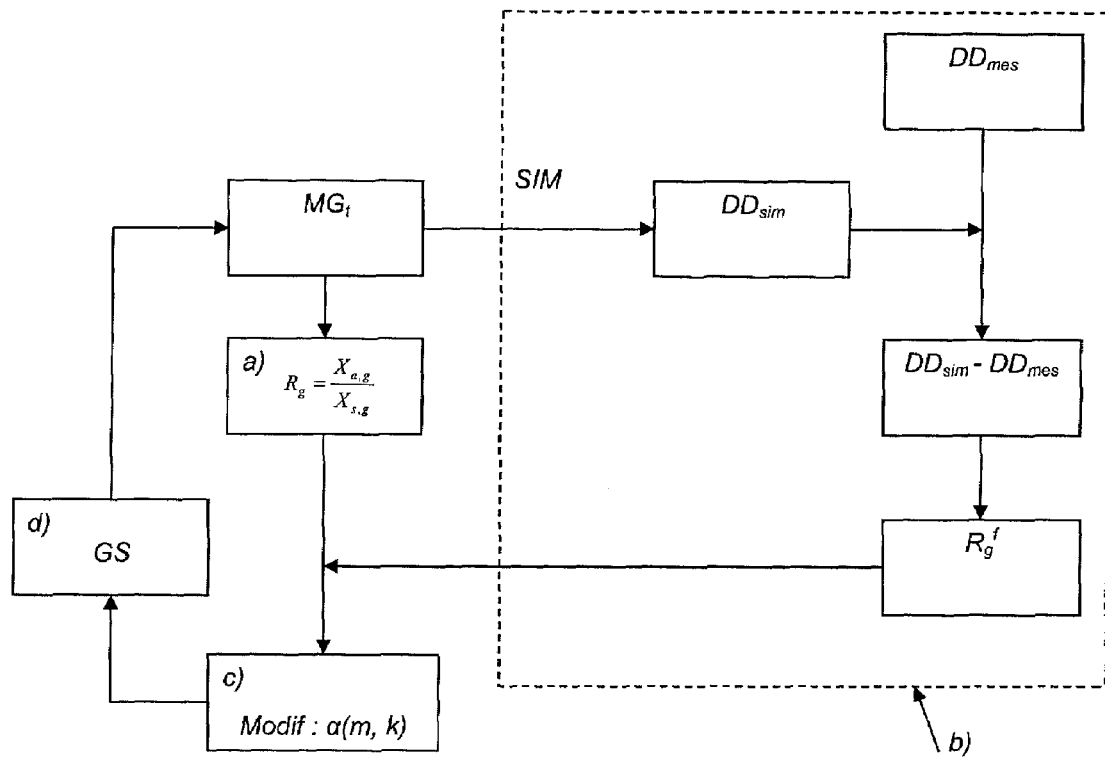
FIG. 1 is a diagram illustrating the historical matching method according to the invention.

The invention relates to a method allowing performing historical matching of a geological model in relation to dynamic data by modifying locally or globally the lithologic facies proportions.

What is referred to as "lithologic facies" is a property of a rock. For example, the lithologic facies can refer to the geological nature of the rock (clay, sandstone, limestone, . . . ), its porosity type (unconsolidated and very porous rock, low-porosity rock, . . . ), or the nature of the fluid trapped in the pores (brine, oil, gas, . . . ).

What is referred to as "geological model" is a map (two-dimensional representation) or a cube (three-dimensional representation) of grid cells associated with properties linked with an underground reservoir. Such a model also accounts for the structural characteristics of this reservoir.

The method is described through a particular embodiment example concerning the historical matching of production data, measured in hydrocarbon-producing wells.

Currently, a historical matching process can be summarized as follows. First of all, a geological model representative of a petroleum reservoir is achieved on a fine scale. This model respects the static data which is the data that do not depend on fluid motions within the modelled reservoir. This geological model is then transferred to a coarse scale referred to as reservoir scale. These scale notions are well known to those in the art. A model referred to as reservoir model is then obtained, to which numerical flow simulations are applied by a flow simulator which is software known to those in the art. The change to the reservoir model scale allows reducing the number of cells in relation to the fine geological model. In fact, the CPU time required for a flow simulation becomes acceptable in practice. Flow simulation provides simulated production data that are then compared with the actually measured production data. If the difference between the simulated dynamic data and the measured dynamic data is sufficiently small, the historical matching process stops. In the opposite case, return is made to the fine geological model that is modified to improve the historical matching of the production data. The iterative process is then repeated until historical matching is considered to be satisfactory.

According to the method, a suitable parameterization allows adjustment of the lithologic facies proportions of the geological model of an underground reservoir which is integrated into a conventional historical matching process to reproduce dynamic data measured in the field. These dynamic data can be production data or data obtained from repeated seismic surveys (4D).

According to the invention, an initial geological model describes the reservoir understudy as facies. Many techniques allowing construction of a constrained geological model are known. An example thereof is the non-stationary modelling technique referred to as a thresholded Gaussian simulation. This technique is described in the following document:

Le Loc'h G. and Galli A., 1997: Truncated Plurigaussian Method: Theoretical and Practical Points of View. In: Geostatistics Wollongong'96, E. Y. Baafi and N. A Schofield eds, Kluwer, p. 211-222.

According to the invention, each of the grid cells of the geological model contains information about at least the lithologic facies proportion values, such as for example: 15% sand, 30% sandstone, 5% clay, etc. The facies proportions can be identical on all the cells of a layer of the model (case of a stationary model) or they can vary from one cell to the next (case of a non-stationary model). These initial geological facies proportions can be determined from the well data and/ or from seismic attributes or data. Such a step is known to those skilled in the art and the following documents can be mentioned by way of example:

Doligez B., Fournier F., Jolivet G., Gancarski S., Beucher H., 2002: Seismic Facies Map Integration in Geostatistical Geological Model: a Field Case. EAGE, Conference & Technical Exhibition of European Association of Geoscientists & Engineers, 64th, Florence, 27-30 May 2002, Extended abstracts, Vol. 2, P215-219.

Barens L., Biver P., 2004: Reservoir Facies Prediction from Geostatistical Inverted Seismic Data, Abu Dhabi International Conference and Exhibition, 10-13 October, SPE 88690-MS.

French patent application 06/10,792.

From the facies proportions and the well data, a geostatistical simulation technique such as the thresholded Gaussian method is used to generate one or more realizations of lithologic facies distributions on the geological grid. For each realization, the probability of simulation of a lithologic facies on a grid cell is conditioned by the facies proportion data. Advantageously, this geological mode also provides information on the petrophysical properties (porosity, permeability, . . . ) that are assigned to the lithologic facies.

The petroleum reservoir has wells from which production data are known to which the geological model is to be matched.

Starting from an initial geological model ($MG_t$), the method mainly comprises the following (FIG. 1):

a) defining a transformation parameter ($R_g$) for the average lithologic facies proportions;

b) determining the value the parameter for the model to best match the production data. Within the context of historical matching, this is carried out by a flow simulator (SIM) which is known software. From a geological model representative of the real reservoir, the simulator allows calculation of a production data prediction ($DD_{sim}$). If the model is modified, notably the facies proportions, the response, that is the production data simulation, is different. It is thus possible, by comparing the simulated production data and the measured data ($DD_{mes}$), to determine a transformation parameter value such that, once modified, the geological model provides a response that is closer to reality;

c) modifying (Modif) the lithologic facies proportions of the geological model so that the parameter has the determined historical matching value;

d) simulating (GS) a new facies model according to these new proportions. Steps b) to d) can be repeated upon each matching process as described above.

Modification of the Lithologic Facies Proportions of a Geological Model

The method described hereafter corresponds to steps a) and c) of the matching process. The invention also relates to a method allowing modification of the lithologic facies proportions of a geological model to respect fixed average proportions of these lithologic facies.

What is referred to as average proportions of lithologic facies is the global estimation of the proportions on a discretization volume made up of a given set of grid cells. The local proportions of lithologic facies are the proportion data in a volume reduced to a cell of the model.

The method selects a group of facies, referred to as selection, and constrains in this selection the average proportion of a subgroup of facies which is referred to as association. In other words, a group of facies (selection), then a subgroup (association) are selected and a parameter is defined by the ratio between the average proportions of the facies of the association and those of the selection. This parameter allows modification of the proportions of the facies of the selection, over the entire model or in a given zone of a set of cells. When the model is stationary, modification of the proportions is applied uniformly to all of the cells of the zone. When the model is non-stationary, the proportions of each cell are modified by accounting for the initial local proportions to respect the average proportion parameter.

The method also defines another proportion adjustment parameter referred to as a "contrast parameter". The principle of the contrast parameter is to act upon the proportion of the most probable lithologic facies in relation to the proportion of the other facies. This contrast parameter can also be applied to the entire model or to a zone corresponding to a set of cells. A power modification law is possible, but the contrast parameter principle can be extended to other laws.

In order to describe more in detail the facies proportion modification method, the following notations and definitions are introduced:

Facies are all of the lithologic facies of the geological model

Zone is a zone of the domain defined by the user (it is assumed there is only one for simplification reasons) and corresponding to a set of cells $p^k_g(m)$ is a "local" proportion of facies k in cell m $p_g^k$ is an average proportion of facies k. In the stationary case, the average and local proportions coincide and, in the non-stationary case:

$$p_g^k = \frac{1}{\text{card}(\text{Zone})} \sum_{m \in zone} p^k(m)$$

card(Zone) is the cardinal of Zone, that is the number of cells contained in zone
Zone
$F_s$ is all of the lithologic facies contained in the selection
$F_a$ is all of the lithologic facies of the association
$X_{s,g}$ is an average proportion of the selection, $$X_{s,g} = \sum_{k \in F_s} p_g^k$$

$X_{a,g}$ is an average proportion of the association, $$X_{a,g} = \sum_{k \in F_a} p_g^k$$

$R_g$ is an average proportion ratio $$\frac{X_{a,g}}{X_{s,g}}$$

$X_s(m)$ is a local proportion of the selection in cell m, $$X_s(m) = \sum_{k \in F_s} p^k(m)$$

$X_a(m)$ is a local proportion of the association in cell m, $$X_a(m) = \sum_{k \in F_a} p^k(m)$$

$R(m)$ is a local proportion ratio $$\frac{X_a(m)}{X_s(m)}$$

$\beta$ is a contrast parameter corresponding to a power law (exponent of the facies proportions).

For all these notations, an exponent $^0$ indicates an initial value which is before modification by the method.

The method allows constraining the average proportion of the facies associated in the selection by acting upon parameter $R_g$. All the facies proportions of the selection are affected by this constraint, while keeping the remaining facies proportions (that is outside the selection) unchanged. This method mainly comprises the following:
defining at least one geographic zone of the reservoir wherein facies proportions $p^k(m)$ are to be modified, by selecting a set of cells of the geological model (the zone can be extended to the entire reservoir);
grouping together p lithologic facies in a first group of facies referred to as selection;
within this first group, grouping together q lithologic facies in a second group of facies (referred to as an association); and
defining a transformation parameter by ratio $R_g$ of the average proportion $X_{a,g}$ of the facies of the second group to the average proportion $X_{s,g}$ of the facies of the first group wherein:

$$R_g = \frac{X_{a,g}}{X_{s,g}}$$

$R_g^0$ is calculated for the initial model, then a value to be respected is fixed: $R_g = R_g^f$.
The proportions of the lithologic facies of the association ($F_a$) and of its complement in the selection $F_s \backslash F_a$ at each cell of the geographic zone and proportionally to the initial proportions $p^{k,0}(m)$ so as to meet ratio $R_g^f$ are modified.
Value $R_g^f$ can be defined according to additional data (well data, well test interpretation, geological constraint, seismic constraint, etc.) or in the iterative historical matching process.

Stationary Case

In a stationary case, the facies proportions $p^k(m)$ are identical at any point of the grid. Consequently: $p_g^k = p^k(m)$.
By noting $$A = \frac{R_g}{R_g^0} \text{ and } B = \frac{1 - R_g}{1 - R_g^0},$$

the facies proportions of the association and of its complement in the selection are modified as follows:

$$\forall k \in F_a, p^k(m) = p_g^k = A \times p_g^{k,0} \quad \text{(Eq. 1)}$$

$$\forall k \in F_s \backslash F_a, p^k(m) = p_g^k = B \times p_g^{k,0} \quad \text{(Eq. 2)}$$

Therefore:

$$X_a(m) = \sum_{k \in F_a} p^k(m) = \sum_{k \in F_a} A \times p_g^{k,0}.$$

Three particular cases can arise:
If $X_{s,g}^0 = 0$, the transformation cannot be applied and the facies proportions must remain unchanged.
If $R_g^0 = 1$, this means that initially all the proportions of the facies of set $X_s \backslash X_a$ are zero. In this case, the formula (Eq.2) cannot be applied and the facies of group $X_s \backslash X_a$ are assumed to appear in identical proportions. Thus, in this case:

$$\forall k \in F_a, p^k(m) = p_g^k = A \times p_g^{k,0} \quad \text{(Eq. 1)}$$

$$\forall k \in F_s \backslash F_a, p^k(m) = p_g^k = \frac{(1 - R_g)X_{s,g}^0}{\text{card}(F_s \backslash F_a)} \quad \text{(Eq. 2')}$$

If $R_g^0 = 0$, proceeding is in the same way:

$$\forall k \in F_a, p^k(m) = p_g^k = \frac{R_g X_{s,g}^0}{\text{card}(F_a)} \quad \text{(Eq. 1')}$$

$$\forall k \in F_s \backslash F_a, p^k(m) = p_g^k = B \times p_g^{k,0} \quad \text{(Eq. 2)}$$

Non-stationary Case

In a non-stationary case, the modification is similar to the previous case and it preserves, to a certain extent, the local facies distribution observed initially. In fact, the global modification of the facies proportions is distributed locally according to the initial proportions of each cell. Thus, using the same notations:

$$\forall k \in F_a, \quad p^k(m) = p^{k,0}(m) + A_{loc} \times \frac{p^{k,0}(m)}{X_a^0(m)}, \quad \text{(Eq. 3)}$$

$$\forall k \in F_s \setminus F_a, \quad p^k(m) = p^{k,0}(m) + B_{loc} \times \frac{p^{k,0}(m)}{X_s^0(m) - X_a^0(m)}, \quad \text{(Eq. 4)}$$

with:

$$A_{loc} = \begin{cases} (A-1)X_a^0(m), & \text{si } R_g \leq R_g^0 \text{ et } R_g^0 \neq 0, \\ -(B-1)(X_s^0(m) - X_a^0(m)), & \text{sin on.} \end{cases}$$

$B_{loc} = -A_{loc}$

As in the stationary case, the transformation cannot be applied when $X_{s,g}^0 = 0$. It can be noted that quantities $A_{loc}$ and $B_{loc}$ are always well defined, including $R_g^0 = 0$ and $R_g^0 = 1$. Locally, particular cases may arise. In fact, for $X_s^0(m) = 0$, the facies proportions must remain unchanged for cell m;

for $X_a^0(m) = 0$, then $\forall k \in F_s \setminus F_a, \quad p^k(m) = \frac{B_{loc}}{card(F_s \setminus F_a)}$; and for $X_s^0(m) = X_a^0(m)$, then $\forall k \in F_s \setminus F_a$, $$p^k(m) = \frac{B_{loc}}{card(F_s \setminus F_a)}.$$

In fact, whatever the case, the lithologic facies proportions of the association are transformed by applying a transformation of the type as follows:

$$\forall k \in F_s, \quad p^k(m) = \alpha(m,k) \cdot p^{k,0}(m) \quad \text{(m)}$$

with:

$p^k(m)$ being the proportion of facies k in a cell m after transformation $p^{k,0}(m)$ being the proportion of facies k in a cell m before transformation $\alpha(m,k)$ being a coefficient depending on transformation parameter $R_g$ and on the initial facies proportions.

Thus, by means of a single global parameter $R_g$, the local proportions of the facies of the selection in the entire zone can be modified.

Whatever the case, the method allows accounting for the data observed in wells (conditioning data; the cells traversed by wells are excluded from the transformation zone; and the observed facies are directly assigned thereto.

The transformations defined above can be applied to regions previously defined by a set of cells (regional transformation) or to the entire model (global transformation, the region is the complete model). In the case of regional transformations, a particular zone of the reservoir in which the facies proportions are to be modified is defined. These average facies proportions are calculated independently in each region. The transformation method only affects the facies proportions of the zone considered.

According to another embodiment, a second transformation parameter, referred to as contrast parameter, is used to calculate the final facies proportions over all of the cells of the geological model. This contrast parameter allows increasing or reducing the probability of appearance of the lithologic facies whose probability is dominant. In a geostatistical simulation process, a high contrast parameter is translated into geostatistical realizations close to the most probable facies. Conversely, a low contrast parameter tends towards an equiprobable facies appearance on a set of independent realizations, which is translated into proportions that are evenly distributed among the facies.

In order to vary the contrast between the facies, a power transformation can be applied with the following formulation:

$$\forall m \in \text{Zone}, \forall k \in \text{Facies}, \quad p^{k,final}(m) = \frac{(p^k(m))^\beta}{\sum_{i \in Facies} (p^i(m))^\beta}$$

Parameter $\beta$ is the contrast parameter and is a real number ranging between 0 and 1. It allows increasing the proportion of the facies that are the most represented by exponent values greater than 1. When the parameter is less than 1, the influence of the most represented facies is decreased and a tendency towards facies proportions that are evenly distributed for low values occurs. When the parameter is 1, the initial proportions are unchanged. The new values obtained are normalized so that the sum of the transformed proportions is a unitary sum.

This contrast parameter can be applied, globally or in regions, once all the other transformations have been carried out or before the other transformations.

In cases where the initial facies proportions are determined from seismic attributes or data, the contrast parameter increase allows increasing the impact of the seismic constraint in relation to the random realizations. In the extreme, a very high contrast parameter is translated into deterministic realizations corresponding to the distribution of the most probable facies.

Modification of the Lithologic Facies of a Geological Model

The method described hereafter corresponds to step d) of the historical matching process. The invention also relates to a method allowing gradual modification of a geostatistical model by locally or globally modifying the proportions of lithologic facies. The method mainly comprises the following steps:

defining at least one geographic zone of the reservoir wherein facies proportions $p^k(m)$ are to be modified, by selecting a set of grid cells of the geological model;

modifying proportions of lithologic facies by applying the previous lithologic facies proportion modification method, notably by modifying the proportions of lithologic facies of an association ($F_a$) and of its complement in its selection ($F_s \setminus F_a$), at each cell of the geographic zone, to impose a fixed value for transformation parameter $R_g$. A contrast parameter can also be applied; and a new geological model constrained by the modified lithologic facies proportions is simulated.

A simulation method allowing providing this transformation with a gradual and continuous character is preferably used.

Figure 2:
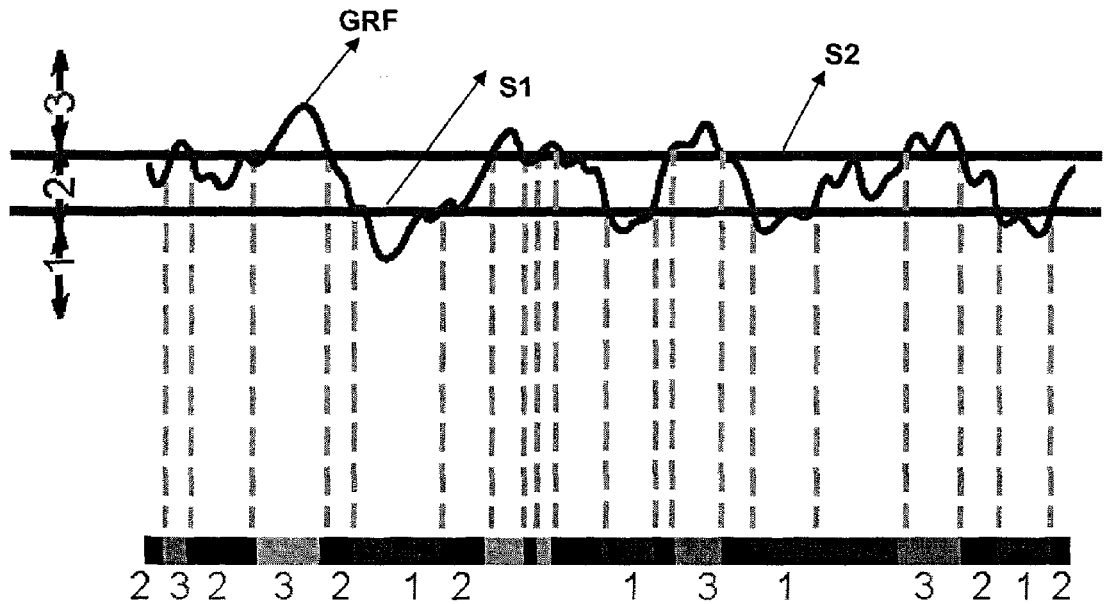
FIG. 2 illustrates the principle of the thresholded Gaussian method.

A simulation based on the thresholded Gaussian technique, as mentioned above, can for example be used. In fact, this method generates a Gaussian realization of a random function. This Gaussian realization of a continuous variable is transformed into categories corresponding to the lithologic facies by truncating it by means of threshold values. The thresholds define intervals of belonging to a lithologic facies. FIG. 2 illustrates the principle of this thresholded Gaussian method. It shows a 1D Gaussian realization of a random function (GRF) and two thresholds (S1 and S2) allowing defining three facies (1, 2 and 3). A facies thus corresponds to each simulated value in a grid. The thresholds are defined according to the lithologic facies proportions. An interval between 2 thresholds is small if the corresponding facies has a small proportion. In other words, these proportions allow deducing the "position" of the thresholds. According to the method, the facies proportions are modified. The position of the thresholds is therefore modified. A new facies model is obtained by carrying out a simulation by the thresholded Gaussian method. Since the Gaussian realization is a continuous variable, if a threshold is gradually displaced, the facies distribution modification is necessarily gradual.

According to a particular embodiment, several transformations can be applied successively to introduce various historical matching parameters. These transformations can be different.

This method does not require much calculation time but it does not take into account the continuity constraint data for modifying the facies proportion distribution wherein the proportion transformations are performed independently of one another in each region. It can however be noted that the continuity of the facies realizations is maintained because a variogram is applied in the geostatistical simulation process. When a continuity has to be maintained for the facies proportion distribution, an approach using kriging can be advantageously combined to smooth the transformations and to provide continuity between regions. In this case, the kriging technique allows constraining the average proportion values per region while keeping a progressive evolution of the transformation determined by a variogram. The procedure is as follows.

According to the transformation selected (by the user), values $R^0(m)$ are calculated at each cell m of the model, including outside the transformation zone. This discrete function $R^0$ is considered to be a first distribution that is then conditioned to the wells according to the observed facies, as well as in the transformation zone by imposing an average value $R_g^f$ input by the user or deduced from an optimization. A second distribution $R_{cond}$ is then obtained. At the wells, the values of $R_{cond}$ are 1 or 0 if the facies observed belongs to set $F_a$ or $F_s\backslash F_a$. This facies may also not be present in the selection. In this case, $R_{cond}$ is not defined, therefore, it is not tried to condition $R_{cond}$ at this point. Conditioning can be performed by a simple kriging algorithm where variogram data must be specified in addition to the data relative to the transformations. Conditioning by kriging is a technique that is known. Simple kriging and block kriging are in particular detailed in:

P. Goovaerts: Geostatistics for Natural Resources Evaluation, Oxford University Press, 1997, pp. 125-185.

From the new values $R_{cond}(m)$, the proportions of the facies of the selection at each cell of the model are recalculated, as follows:

$$\forall k \in F_a, p^k(m) = A(m) \times p^{k,0}(m), \text{ with } A(m) = \frac{R_{cond}(m)}{R^0(m)};$$

$$\forall k \in F_s \backslash F_a, p^k(m) = B(m) \times p^{k,0}(m), \text{ with } B(m) = \frac{1 - R_{cond}(m)}{1 - R^0(m)}.$$

Particular cases appear at cells m where $X_s^0(m)=0$, $R^0(m)=1$ or $R^0(m)=0$. These particular cases can be solved in the same way as the stationary case.

Application Example

The application example presented in this section is based on a synthetic reservoir model representing a well test simulation in a channel. An initial model is constructed by a geostatistical simulation using the thresholded Gaussian method. The initial facies proportions that can be obtained from 3D seismic data give the major spatial distribution trends of the facies. The reservoir model is assumed to be described with four facies, which are, in increasing order of reservoir quality: "clays" (F1), "laminated clays" (F2), "laminated sands" (F3) and "sands" (F4). The "clays" and "laminated clays" facies (F1+F2) are present in the levee regions and the "laminated sands" and "sands" facies (F3+F4) in the channels. The average proportions of laminated clays in the levees and of sands in the channels exhibit an uncertainty margin that should be reduced by constraining the average proportions by the well test data.

Figure 3:
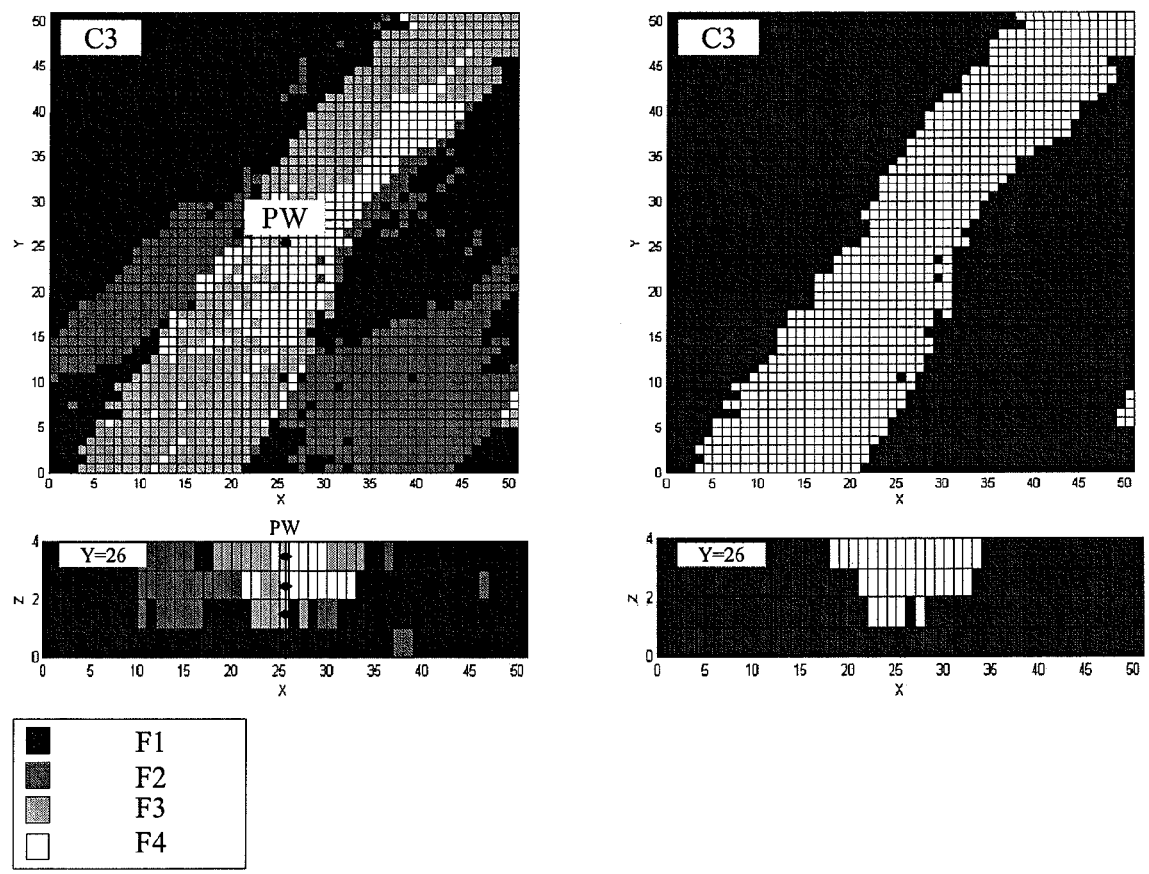
FIG. 3 illustrates an initial geological model (left) and a definition of regions, channels and levees (right)

The initial geological model given by the facies spatial distribution is shown in FIG. 3. The initial geological model is presented on the left, according to a top view (axes X and Y) for a level C3 at the top of FIG. 3, and according to a vertical section as a function of depth Z for Y=26, at the bottom of FIG. 3. The geometry of the channel in which a production well (PW) is located can be distinguished. The well is drilled over the total height of the reservoir. The definition of the channel and levee regions is given on the right in FIG. 3. The regions are used to calculate and parameterize the average facies proportions with a view toward historical matching of the well test data. The four facies F1 to F4 are shown.

The petrophysical properties (porosity and permeability) are constant per facies. The values below (Table 1) have been selected for the flow simulations:

TABLE 1

Values of the petrophysical properties per facies

| Facies | Porosity (adim) | Horizontal permeability (mD) | Vertical anisotropy ratio Kv/Kh (adim) |
|---|---|---|---|
| F1 | 0.02 | 10 | 0.1 |
| F2 | 0.08 | 50 | 0.1 |
| F3 | 0.15 | 300 | 0.1 |
| F4 | 0.25 | 800 | 0.1 |

The channel and levee regions have been defined from the facies (FIG. 3) wherein the levee regions correspond to the presence of facies F1 and F2 and the channel regions correspond to the presence of facies F3 and F4. These regions are used for parameterizing the average facies proportions in the channels and levees, with a view to history matching of these parameters by the well test data:

a first transformation parameter corresponds to the average proportion of laminated clays in the levees:

$$\frac{\% F2}{\% (F1 + F2)}$$

a second transformation parameter corresponds to the average proportion of sands in the channels:

$$\frac{\% F3}{\% (F3 + F4)}.$$

A synthetic well test was simulated from reference facies proportions in a non-stationary context. The reference model was generated with the following transformation parameter values: 0.46 for the first parameter and 0.51 for the second parameter. The well test (drawdown test) is simulated over a period of 100 hours, with a constant flow rate of 650 m³/day.

The synthetic well test data comprise the pressure difference and its derivative. For historical matching of the well test, the initial values were set at 0.2 for the two transformation parameters that can range between 0 and 1 during the matching process. Table 2 below synthesizes the proportion parameter values for the reference model and for the initial model. The reference proportions (right column) are the values used for generating the synthetic well test data. The initial values are the starting point of the optimization performed for historical matching of the well test.

TABLE 2

Definition and values of the average facies proportion parameters

| Region | Facies of the selection | Facies of the association | Initial proportions of the facies of the association within the selection | Values of the reference proportions |
|---|---|---|---|---|
| Levees | F1 + F2 | F2 | 0.2 | 0.46 |
| Channels | F3 + F4 | F4 | 0.2 | 0.51 |

An optimization algorithm based on a gradient method was used for historical matching of the well test by adjusting the two proportion parameters, starting from the initial values. The algorithm performs an iterative minimization of an objective function of least squares type, which quantifies the difference between the numerical simulation of the well test and the data. The optimization converges in 7 simulations and allows finding average facies proportion values that are very close to the reference values: 0.453 for parameter 1 (for a reference value of 0.46) and 0.509 for parameter 2 (for a reference value of 0.51). The optimum parameter values allow a very good restitution of the well test data.

Figure 4:
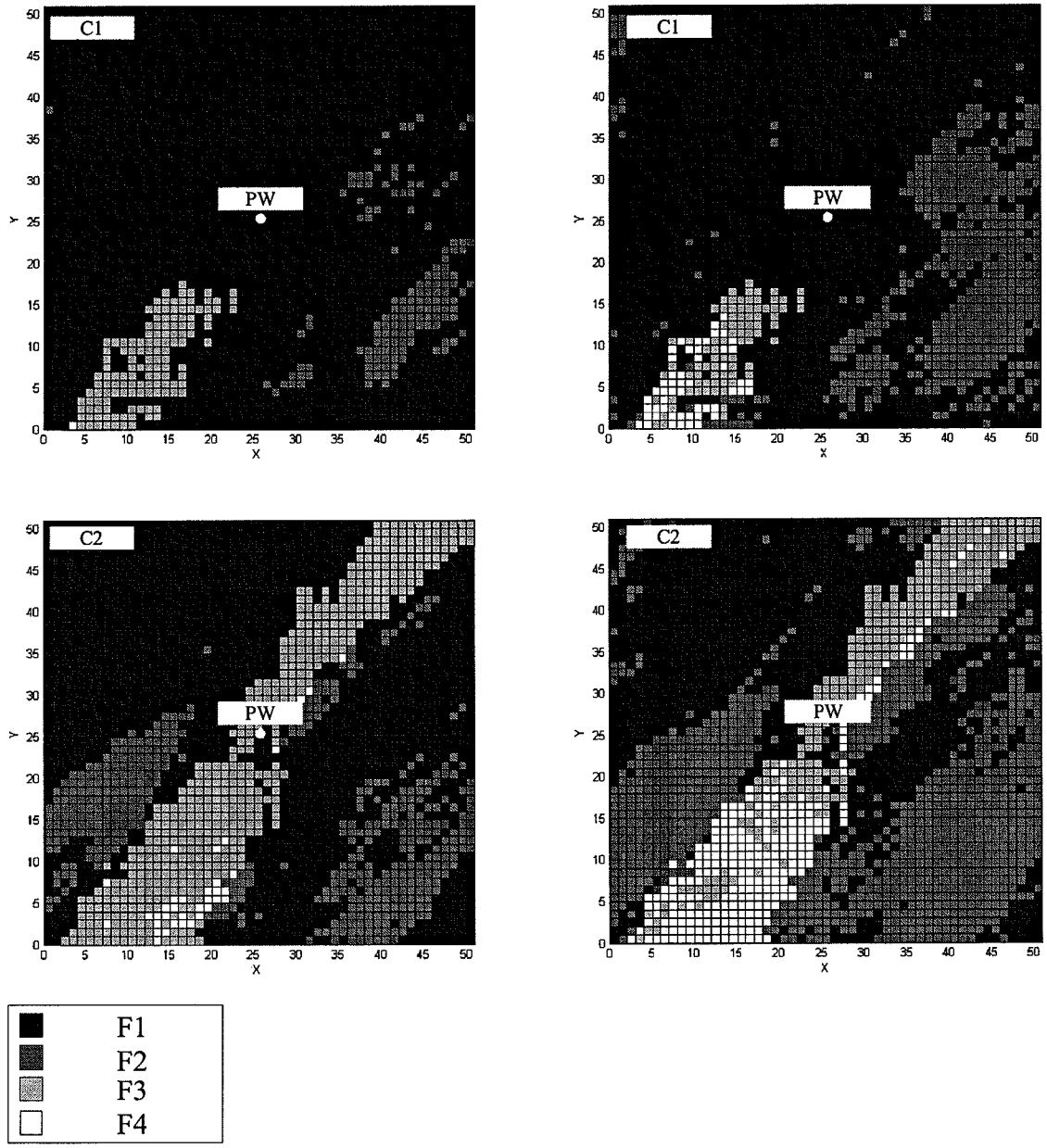
FIG. 4 shows the spatial distribution of the facies in the reservoir model before and after history matching of the facies proportions for layers 1 and 2.
Figure 5:
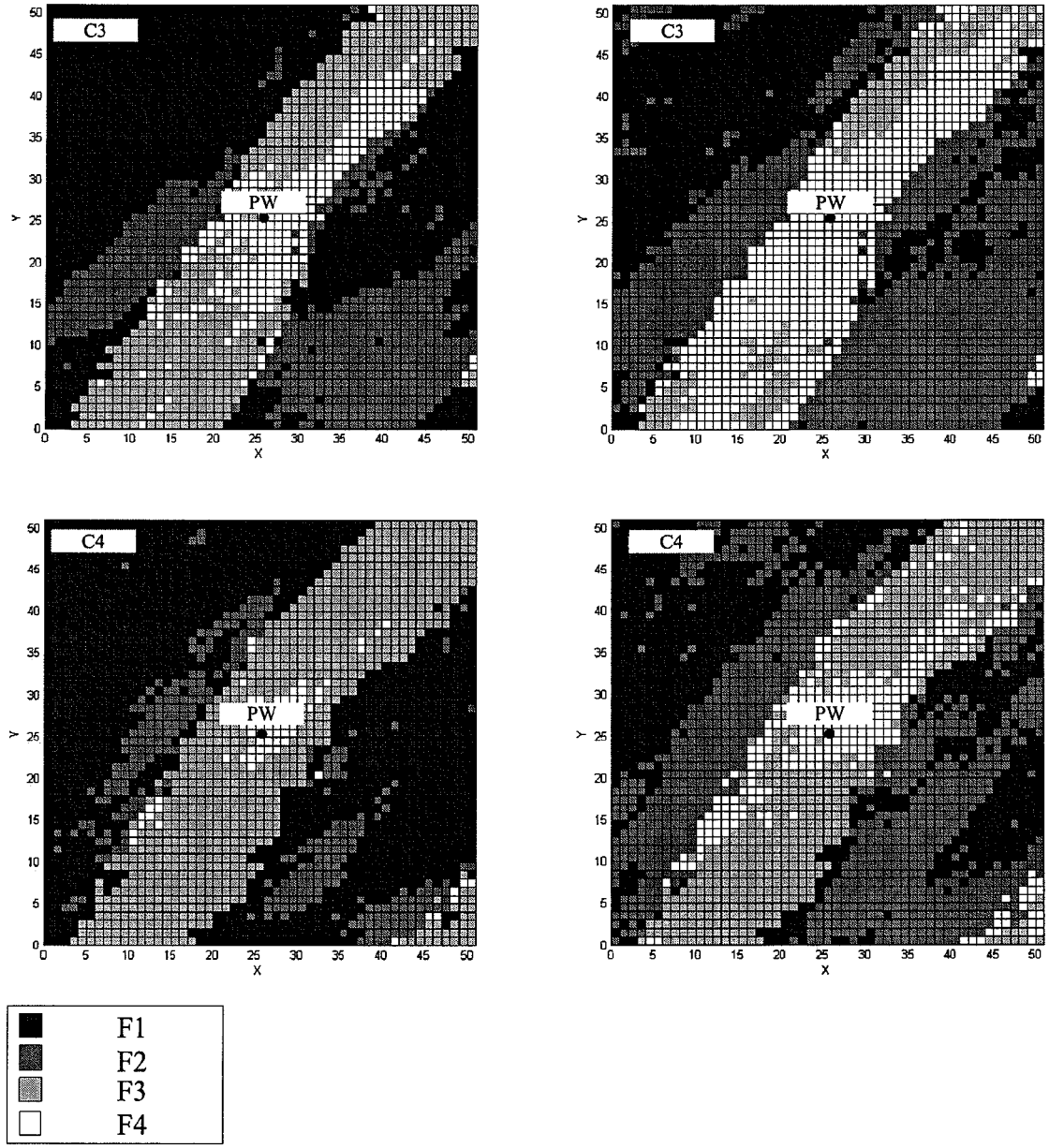
FIG. 5 shows the facial distribution of the facies in the reservoir model before and after historical matching of the facies proportions for layers 3 and 4.

FIG. 4 and FIG. 5 show the impact of the facies proportion history matching on the geological model. FIG. 4 shows the spatial distribution of the facies on the reservoir model before and after facies proportion matching. The images on the left show layers 1 and 2 (C1, C2) are obtained with the initial proportions and the images on the right are the same layers with the final proportions. FIG. 5 shows the spatial distribution of the facies on the reservoir model before and after facies proportion matching. The images on the left represent layers 3 and 4 (C3, C4) obtained with the initial proportions, the images on the right the same layers with the final proportions.

Historical matching of the well test was carried out by increasing the average proportion of facies F2 (laminated clays) in the levees and the average proportion of facies F4 (sands) in the channels. The spatial distribution of the facies shows a larger extent of these facies on the optimal model in relation to the initial model.

It can be noted that optimization is carried out over a fixed geostatistical realization (frozen seed during optimization). It is also possible to simultaneously match the facies proportions and the realization using the gradual deformation method. In this case, matching the facies proportion allows modification of the main trends and the gradual deformation method allows modification of the local distribution of the heterogeneities with fixed proportions.

This methodology is therefore complementary in relation to the gradual deformation method: facies proportion matching introduces a control over the average spatial trends whereas the gradual deformations act upon the local distribution of the heterogeneities with fixed average proportions.

The invention claimed is:

1. A method for gradually deforming a geological model representative of an underground reservoir including set of grid cells comprising information on lithologic facies, for fixed average proportions of the lithologic facies, the average proportions being calculated by averaging facies proportions over at least one geographic zone of the reservoir, comprising:
    defining the at least one geographic zone of the reservoir by selecting a set of grid cells of the geological model;
    grouping together the lithologic facies in a first group of facies;
    within the first group, grouping together the facies in a second group of facies;
    defining a transformation parameter by a ratio of an average proportion of the facies of the second group to an average proportion of the facies of the first group;
    transforming the lithologic facies proportions of the second group and complements thereof in the first group, at each cell of the geographic zone, to impose a fixed value for the ratio; and
    simulating a new geological model constrained by the transformed lithologic facies proportions.

2. A method as claimed in claim 1, wherein the lithologic facies proportions of the second group are transformed by applying a transformation comprising:

$$\forall k \in F_s,\ p^k(m) = \alpha(m,k) \cdot p^{k,0}(m)$$

with:
   k being a facies belonging to a set of p lithologic facies of the first group of facies with p being a number of lithologic facies in the first group;
   $p^k$ (n) being a proportion of facies k in a cell m after transformation;
   $p^{k,0}$ (m) being a proportion of facies k in a cell m before transformation; and
   $\alpha(m, k)$ being a coefficient depending on transformation parameter $R_g$ and on the lithologic facies proportions before transformation which $R_g$ being the ratio.

3. A method as claimed in claim 1, wherein a new geological model is simulated by a thresholded Gaussian method.

4. A method as claimed in claim 2, wherein a new geological model is simulated by a thresholded Gaussian method.

5. A method as claimed in claim 1, wherein values of the average proportion are constrained by a kriging technique.

6. A method as claimed in claim 2, wherein values of the average proportion are constrained by a kriging technique.

7. A method as claimed in claim 3, wherein values of the average proportion are constrained by a kriging technique.

8. A method as claimed in claim 4, wherein values of the average proportion are constrained by a kriging technique.

9. A method as claimed claim 1, wherein transformations are successively applied.

10. A method as claimed claim 2, wherein transformations are successively applied.

11. A method as claimed claim 3, wherein transformations are successively applied.

12. A method as claimed claim 4, wherein transformations are successively applied.

13. A method as claimed claim 5, wherein transformations are successively applied.

14. A method as claimed claim 6, wherein transformations are successively applied.

15. A method as claimed claim 7, wherein transformations are successively applied.

16. A method as claimed claim 8, wherein transformations are successively applied.

17. A method as claimed in claim 9, wherein contrast between the lithologic facies is modified by applying to the geological model a power transformation comprising:

$$\forall m \in \text{Zone}, \forall k \in \text{Facies}, p^{k,final}(m) = \frac{(p^k(m))^\beta}{\sum_{i \in Facies} (p^i(m))^\beta}$$

wherein:
Facies are all lithologic facies of the geological model;
Zone is a zone of a domain defined by a user and corresponding to a set of grid cells;
$p^k(m)$ is a local proportion of facies k in cell m;
$p^{k,final}(m)$ is a proportion of facies k in cell m after application of the power transformation; and
$\beta$ is a contrast parameter and a real number ranging between 0 and 1.

18. A method as claimed in claim 10, wherein contrast between the lithologic facies is modified by applying to the geological model a power transformation comprising:

$$\forall m \in \text{Zone}, \forall k \in \text{Facies}, p^{k,final}(m) = \frac{(p^k(m))^\beta}{\sum_{i \in Facies} (p^i(m))^\beta}$$

wherein:
Facies are all lithologic facies of the geological model;
Zone is a zone of a domain defined by a user and corresponding to a set of grid cells;
$p^k(m)$ is a local proportion of facies k in cell m;
$p^{k,final}(m)$ is a proportion of facies k in cell m after application of the power transformation; and
$\beta$ is a contrast parameter and a real number ranging between 0 and 1.

19. A method as claimed in claim 11, wherein contrast between the lithologic facies is modified by applying to the geological model a power transformation comprising:

$$\forall m \in \text{Zone}, \forall k \in \text{Facies}, p^{k,final}(m) = \frac{(p^k(m))^\beta}{\sum_{i \in Facies} (p^i(m))^\beta}$$

wherein:
Facies are all lithologic facies of the geological model;
Zone is a zone of a domain defined by a user and corresponding to a set of grid cells;
$p^k(m)$ is a local proportion of facies k in cell m;
$p^{k,final}(m)$ is a proportion of facies k in cell m after application of the power transformation; and
$\beta$ is a contrast parameter and a real number ranging between 0 and 1.

20. A method as claimed in claim 12, wherein contrast between the lithologic facies is modified by applying to the geological model a power transformation comprising:

$$\forall m \in \text{Zone}, \forall k \in \text{Facies}, p^{k,final}(m) = \frac{(p^k(m))^\beta}{\sum_{i \in Facies} (p^i(m))^\beta}$$

wherein:
Facies are all lithologic facies of the geological model;
Zone is a zone of a domain defined by a user and corresponding to a set of grid cells;
$p^k(m)$ is a local proportion of facies k in cell m;
$p^{k,final}(m)$ is a proportion of facies k in cell m after application of the power transformation; and
$\beta$ is a contrast parameter and a real number ranging between 0 and 1.

21. A method as claimed in claim 13, wherein contrast between the lithologic facies is modified by applying to the geological model a power transformation comprising:

$$\forall m \in \text{Zone}, \forall k \in \text{Facies}, p^{k,final}(m) = \frac{(p^k(m))^\beta}{\sum_{i \in Facies} (p^i(m))^\beta}$$

wherein:
Facies are all lithologic facies of the geological model;
Zone is a zone of a domain defined by a user and corresponding to a set of grid cells;
$p^k(m)$ is a local proportion of facies k in cell m;
$p^{k,final}(m)$ is a proportion of facies k in cell m after application of the power transformation; and
$\beta$ is a contrast parameter and a real number ranging between 0 and 1.

22. A method as claimed in claim 14, wherein contrast between the lithologic facies is modified by applying to the geological model a power transformation comprising:

$$\forall m \in \text{Zone}, \forall k \in \text{Facies}, p^{k,final}(m) = \frac{(p^k(m))^\beta}{\sum_{i \in Facies} (p^i(m))^\beta}$$

wherein:
Facies are all lithologic facies of the geological model;
Zone is a zone of a domain defined by a user and corresponding to a set of grid cells;
$p^k(m)$ is a local proportion of facies k in cell m;
$p^{k,final}(m)$ is a proportion of facies k in cell m after application of the power transformation; and
$\beta$ is a contrast parameter and a real number ranging between 0 and 1.

23. A method as claimed in claim 15, wherein contrast between the lithologic facies is modified by applying to the geological model a power transformation comprising:

$$\forall m \in \text{Zone}, \forall k \in \text{Facies}, p^{k,final}(m) = \frac{(p^k(m))^\beta}{\sum_{i \in Facies} (p^i(m))^\beta}$$

wherein:
Facies are all lithologic facies of the geological model;
Zone is a zone of a domain defined by a user and corresponding to a set of grid cells;
$p^k(m)$ is a local proportion of facies k in cell m;
$p^{k,final}(m)$ is a proportion of facies k in cell m after application of the power transformation; and
$\beta$ is a contrast parameter and a real number ranging between 0 and 1.

24. A method as claimed in claim 16, wherein contrast between the lithologic facies is modified by applying to the geological model a power transformation comprising:

$$\forall m \in \text{Zone}, \forall k \in \text{Facies}, p^{k,final}(m) = \frac{(p^k(m))^\beta}{\sum_{i \in Facies} (p^i(m))^\beta}$$

wherein:

Facies are all lithologic facies of the geological model;

Zone is a zone of a domain defined by a user and corresponding to a set of grid cells;

$p^k(m)$ is a local proportion of facies k in cell m;

$p^{k,final}(m)$ is a proportion of facies k in cell m after application of the power transformation; and β is a contrast parameter and a real number ranging between 0 and 1.

25. A method according to claim 1 for historical matching of the new geological model of the underground reservoir to reproduce measured dynamic data, comprising measuring a difference between the measured dynamic data values and dynamic data using a flow simulator applied to the new geological model, and the new geological model is gradually modified to minimize error.

* * * * *